United States Patent
Sihlbom et al.

(10) Patent No.: US 9,001,866 B2
(45) Date of Patent: Apr. 7, 2015

(54) MULTI-STANDARD COMMUNICATION

(75) Inventors: Bjorn Sihlbom, Vastra Frolunda (SE); Bo Lyckegard, Torslanda (SE)

(73) Assignee: Unwired Planet, LLC, Reno, NV (US)

( * ) Notice: Subject to any disclaimer, the term of this patent is extended or adjusted under 35 U.S.C. 154(b) by 0 days.

(21) Appl. No.: 13/505,013

(22) PCT Filed: Nov. 3, 2009

(86) PCT No.: PCT/EP2009/064506
§ 371 (c)(1),
(2), (4) Date: Apr. 30, 2012

(87) PCT Pub. No.: WO2011/054369
PCT Pub. Date: May 12, 2011

(65) Prior Publication Data
US 2012/0213253 A1    Aug. 23, 2012

(51) Int. Cl.
H04B 1/00    (2006.01)
H04B 7/08    (2006.01)
H04L 25/02   (2006.01)

(52) U.S. Cl.
CPC ............ *H04B 7/0842* (2013.01); *H04L 25/022* (2013.01); *H04L 25/0228* (2013.01)

(58) Field of Classification Search
USPC .................................. 375/148, 147, 140, 130
See application file for complete search history.

(56) References Cited

U.S. PATENT DOCUMENTS

2003/0123530 A1*  7/2003  Maeda et al. ................. 375/148
2006/0220949 A1* 10/2006  Nohmi ......................... 342/160
2007/0206687 A1*  9/2007  Ananth et al. ................ 375/260
2009/0067634 A1*  3/2009  Oh et al. ........................ 381/17
2009/0252099 A1* 10/2009  Black et al. ................... 370/329

FOREIGN PATENT DOCUMENTS

WO       2007/077709 A2    9/2004
WO   WO 2004-077709    *   9/2004

OTHER PUBLICATIONS

Held, I. et al., "Receiver architecture and performance of WLAN/ ceUular rnuiti-mode and multi-standard mobile terminals" 2004 IEEE 60th Vehicular Technology Conference. VTC2004-Fall (tEEE Cat. No. 04CH37575) IEEE Piscataway, N J, USA, vol. 3, 2004, pp. 2248-2253, XP002592701 ISBN: 0-7803-8521-7.*

Held, I. et al., "Receiver architecture and performance of WLAN/ cellular multi-mode and multi-standard mobile terminals" 2004 IEEE 60th Vehicular Technology Conference. VTC2004-Fall (IEEE Cat. No. 04CH37575) IEEE Piscataway, NJ, USA, vol. 3, 2004, pp. 2248-2253, XP002592701 ISBN: 0/7803-8521-7.

* cited by examiner

Primary Examiner — Zewdu Kassa
(74) Attorney, Agent, or Firm — Nixon & Vanderhye, P.C.

(57) ABSTRACT

A communication node (115) with is arranged to receive signals from at least one antenna (120). A frequency domain conversion is executed (201) for two or more antenna signals by receiving (201a) a continuous signal from one of the at least one antenna (120), splitting (201b) the continuous antenna signal into windowed signals, and performing (201e) a frequency domain conversion of the windowed signals. Then, a channel estimate based on a frequency converted pilot signal is provided (202) by extracting (202a) a pilot signal, splitting (202b) the pilot signal into windowed signals, performing (202d) a frequency domain conversion of the split pilot signal; and providing (202e) a channel estimate of the frequency converted pilot signal. Diversity combined signals are provided (203) by performing (203a) diversity combining based on the frequency converted windowed signals and the channel estimate, and by combining (203c) the diversity combined signals.

17 Claims, 10 Drawing Sheets

MULTI-STANDARD COMMUNICATION

CROSS REFERENCE TO RELATED APPLICATION(S)

This application is a 35 U.S.C. §371 National Phase Entry Application from PCT/EP2009/064506, filed Nov. 3, 2009, designating the United States, the disclosure of which is incorporated herein in its entirety by reference.

TECHNICAL FIELD

This invention relates generally to a method and a communication node in a wireless communication system. More particularly this invention relates to improved signal handling.

BACKGROUND

New wireless communications standards such as for example Wireless Fidelity (WiFi), Worldwide Interoperability for Microwave Access (WiMAX) and Long Term Evolution (LTE), uses Orthogonal Frequency Division Multiplex (OFDM) based modulation schemes. These methods are substantially different from Third Generation Partnership Project (3GPP) Wideband Code Division Multiple Access (WCDMA) which uses Code Division Multiple Access (CDMA), and consequently the computing elements in implementations of these standards are different. This makes it difficult to implement a device that support both CDMA based standards and OFDM based standards.

In CDMA, a commonly used receiver algorithm is the "rake receiver". It is fundamentally based on a number of parallel receiver structures, often called "rake fingers". Each "rake finger" is aligned in time with a peak in the impulse response of the transmission channel (which in general is a multi-path channel, i.e. a fading channel). For complex channels, e.g. multiple transmission paths, and in combination with Doppler shifts many rake fingers must be used, and often must be re-aligned as transmission paths fade away, and new appears. To handle these scenarios it is desired to assign a greater number of "rake fingers" to each "rake finger". Thus, the total number of "rake fingers" is a major limiting factor for the capacity of a rake receiver device.

A standard WCDMA rake receiver front-end comprises a few major operations: searching, de-spreading, Radio Frequency (RF) channel coefficient estimation, and de-spread and Maximum Ratio Combining (MRC).

The searching operation is a correlation of the received signal with a known pattern. The outcome of this operation is a timing alignment of the received signal. It also gives information of the alignment of the individual multipath components, i.e. the delay of each individual propagation path from the distant transmitter to the receiver.

De-spreading (and descrambling) is then performed based on the delays obtained during the search operation. The outcome of this operation is crude radio frequency channel coefficient measurements, i.e. the amplitude and phase of each individual multipath component.

The channel coefficient estimation is most of all a filter operation. Filter parameters are adapted to match the fading frequency of each multipath component. The crude radio frequency channel measurements are thus filtered to remove as much measurement noise as possible. At this stage other algorithms may be applied to these coefficients as well.

De-spread and MRC is the final stage in the operations of a standard WCDMA rake receiver, where each individual multipath component is aligned in time (based on delays from the search operation), scaled according to the phase and amplitude of the radio frequency channel coefficients (from the previous channel coefficient estimation operation) and then added together based on the orthogonal WCDMA channelization code (this is the actual de-spreading function). The outcome is symbol estimates of the transmitted symbols (picked from a modulation constellation such as Binary Phase Shift Keying (BPSK) or Quadrature Phase Shift Keying (QPSK)).

The symbol estimates are in later stages of the WCDMA rake receiver demodulated to soft bit estimates, and further processed according to the Forward Error Correction (FEC) scheme dictated by a standard.

There are of course many options in which order these operations are done. The possibility to permute different processing stages is typical for signal processing.

In a standard LTE/WiMAX receiver, timing advance is used. Searching operations are used to estimate the timing alignment of distant transmitters, and then instructed to change their timing, so that signals from distant transmitters are arriving with the same timing at the base station receiver.

The received signal is divided into intervals based on the OFDM symbol length, and transformed to the frequency domain using the Fast Fourier Transform (FFT) algorithm.

The operations of RF channel coefficient measurements, processing and the final MRC in a LTE/WiMAX receiver are in principle similar to the WCDMA processing, but made in the frequency domain.

SUMMARY

It is thus an object of the present invention to provide a method and communication node for improved signal handling.

According to a first aspect of the invention, the objective is achieved by a method in a communication node in a wireless communication system for improving signal handling. The communication node is arranged to receive signals from the at least one antenna. First, a step of executing frequency domain conversion for each antenna signal is preformed. The step of executing comprises the sub steps of receiving a continuous signal from one of the at least one antenna, splitting the continuous antenna signal into windowed signals, and performing a frequency domain conversion of the windowed signals. The next step is to provide a channel estimate based on a frequency converted pilot signal. The step of providing a channel estimate comprises the sub steps of extracting a pilot signal, splitting the pilot signal into windowed signals, performing a frequency domain conversion of the split pilot signal, and providing a channel estimate of the frequency converted pilot signal. The third main step is to provide diversity combined signals. The diversity combining comprises the sub steps of performing diversity combining based on the frequency converted windowed signals and the channel estimate, and combining the diversity combined signals.

According to a second aspect of the invention, the objective is achieved by a communication node in a wireless communication system for improving signal handling. The communication node is arranged to receive signals from the at least one antenna. The communication node further comprises a processor arranged to execute frequency domain conversion for each antenna signal and a receiver arranged to receive a continuous signal from one of the at least one antenna. The node also comprises a splitter arranged to split the continuous antenna signal into windowed signals. The processor is further arranged to perform a frequency domain conversion of the windowed signals, provide a channel estimate based on a frequency converted pilot signal, and to extract a pilot signal. The splitter is further arranged to split the pilot signal into windowed signals. The processor is even further arranged to perform a frequency domain conversion of the split pilot signal, provide a channel estimate of the frequency converted pilot signal, provide diversity combined signals, perform diversity combining based on the frequency converted windowed signals and the channel estimate, and to combine the diversity combined signals.

Thanks to harmonization of the content of algorithms used for CDMA and OFDM standards, the channel equalization in the frequency domain, use of algorithms based on overlapping time windows, a Fast Fourier Transform (FFT) and an antenna signal buffer, signal handling can be improved.

An advantage of the present solution is that multi-standard communication can be provided. The base station can support several standards, for example Wideband Code Division Multiple Access (WCDMA), Long Term Evolution (LTE) and Worldwide Interoperability for Microwave Access (WiMAX).

Another advantage is that the solution provides improved efficiency/performance for a WCDMA receiving device, which is an enabler for better receiver sensitivity and/or support of more radio links.

The present invention also provides more common computing elements for Orthogonal Frequency Division Multiplexing (OFDM) and Code Division Multiple Access (CDMA) based devices, which is an enabler for multi-standard devices.

The "harmonization" of the contents of algorithms used for CDMA and OFDM standards according to the present solution opens for multi-standard receivers as or almost as efficient as optimized single standard receivers. Thus separate receivers for different standards are not required. Also, introducing the FFT based equalizer for CDMA based standards opens for running parts of the receiver algorithms in the frequency domain, thus achieving a more efficient solution.

Furthermore, with the present solution, the number of rake fingers will not be a limiting factor, since all (discrete) possible alignments may be supported (as with a fixed grid rake receiver).

The present invention is not limited to the features and advantages mentioned above. A person skilled in the art will recognize additional features and advantages upon reading the following detailed description.

BRIEF DESCRIPTION OF THE DRAWINGS

The invention will now be further described in more detail in the following detailed description by reference to the appended drawings illustrating embodiments of the invention and in which.

DETAILED DESCRIPTION

The present solution is based on channel equalization in the frequency domain, by using algorithms based on overlapping time windows, and a Fast Fourier Transform (FFT) that provides multi-standard communication. This makes it possible to use the same computing elements for both Orthogonal Frequency Division Multiplexing (OFDM) and Code Division Multiple Access (CDMA) based systems.

Figure 1:
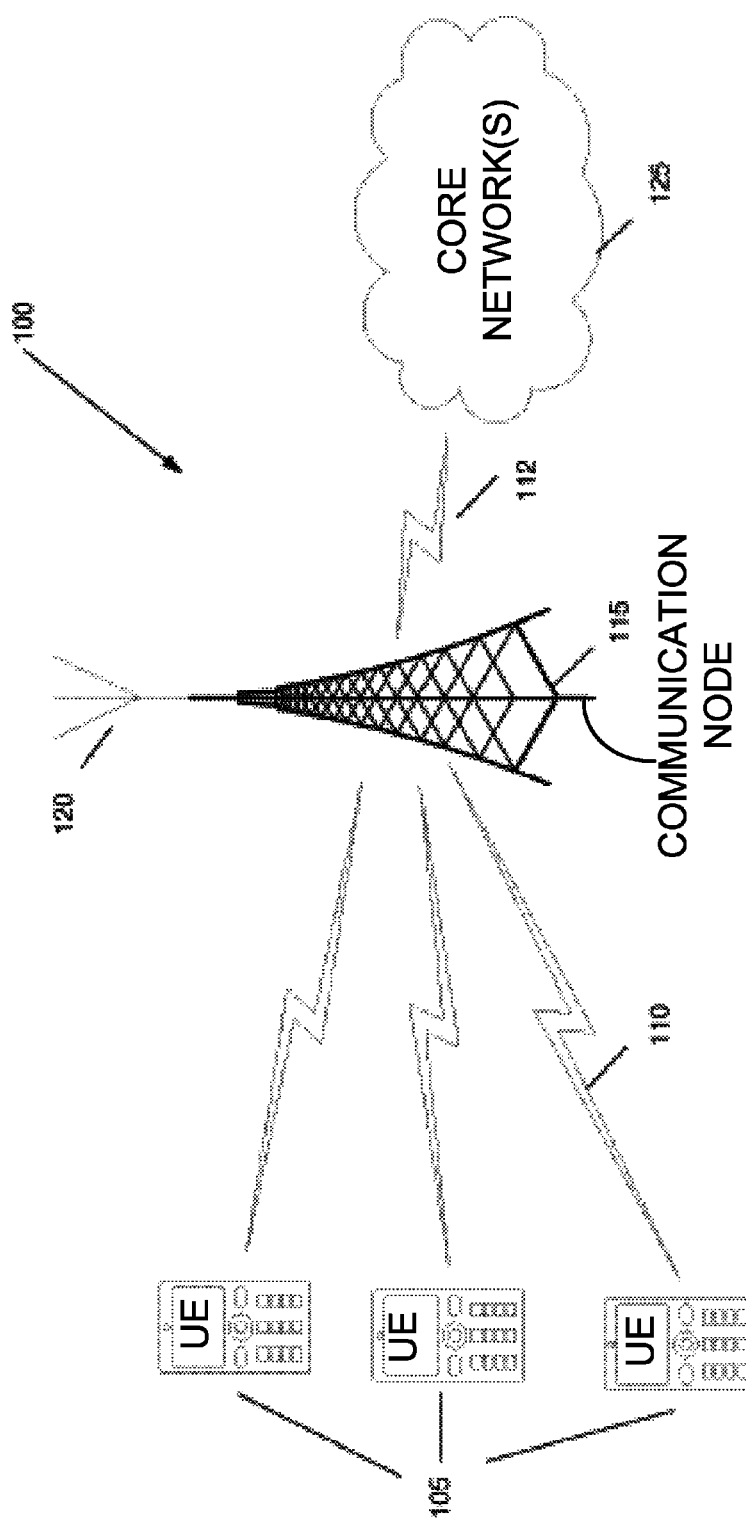
FIG. 1 is a schematic block diagram illustrating a wireless communication system.

FIG. 1 is a schematic block diagram illustrating a wireless communication system 100 according to the present solution. The wireless communication system 100 uses technologies such as Wideband Code Division Multiple Access (WCDMA), Long Term Evolution (LTE), Worldwide Interoperability for Microwave Access (WiMAX), and/or other technologies depending on configurations of the system, either alone or in combination. At least one user equipment 105 communicates via a communication node 115 with one or more core networks 125. The communication node 115 may be a receiver or network access node such as a base station or eNodeB. The communication takes place through a communication link 110, 112. The communication link 110 between the user equipment 105 and the communication node 115 may be a wireless link, and the communication link 112 between the communication node 115 and the core network 125 may be a wired or wireless link. The links 110, 112 may use any suitable protocol depending on type and level of layer, e.g. as indicated by the Open System Interconnection (OSI) model, as understood by the person skilled in the art. The core network 125 provides e.g. internet services to the use equipment 105. Other, not shown, nodes or devices, such as e.g. other communication nodes, base stations, routers, switches, and cabling, may be comprised in the wireless communication network 100.

The user equipment 105 may be any suitable communication device or computational device with communication capabilities, for instance but not limited to mobile phone, smart phone, Personal Digital Assistant (PDA), laptop, MP3 player or portable Digital Versatile Disc (DVD) player or similar media content devices, digital camera, or even stationary devices such as a Personal Computer (PC), surveillance equipment, or other machine to machine communications configurations. A PC may also be connected via a mobile station as the end station of a broadcasted/multicasted media transmission.

The communication node 115 comprises at least one antenna 120 for receiving communication from the user equipment 105.

There are many different operations involved in the present solution. But there are a few operations which have very high capacity requirements, and in a cost effective implementations these are advantageously executed on custom made processing units, such as for instance an Application Specific Integrated Circuit (ASIC), Field Programmable Gate Array (FPGA), or dedicated Digital Signal Processor (DSP). The remaining parts of the processing may be made in software executed on standard "of the shelf" DSP.

For a WCDMA receiver front-end the correlation part of the search operation, along with de-spreading and Maximum Ratio Combining (MRC) operations may be accelerated in custom made processing units. These operations are done in the frequency domain of the OFDM based standard such as LTE and WiMAX.

By separating the de-spreading and MRC operations it is possible to see that the de-spreading operation is very well suited to be done as in the standard WCDMA receiver, but the MRC part (Radio Frequency (RF) channel compensation part) is in fact a convolution, which is a very complex operation when the radio frequency channel contains many multipath elements. As mentioned earlier, in the standard WCDMA receiver (aka rake receiver) each multipath element is processed in what is normally called a "Finger" (compare with the fingers of a garden rake). The number of rake fingers that can be processed in the standard WCDMA receiver is a fundamental capacity limit in the standard WCDMA receiver.

The convolution which the MRC operation is based on may be done in the frequency domain. For the WCDMA receiver according to the present solution, the implication is that the FFT algorithm is to be executed with very high capacity requirements. When the de-spreading and descrambling operations are separated, they are more or less trivial and need not be accelerated for capacity.

The correlations made in the search operations may also be done in the frequency domain.

Figure 2A:
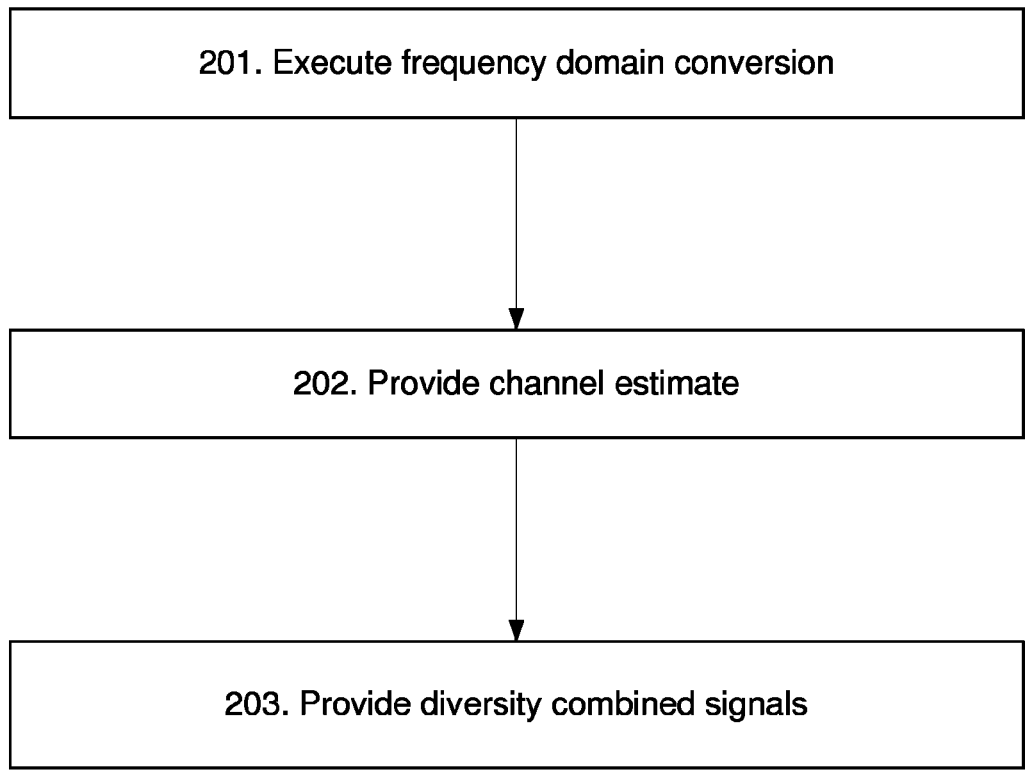
FIGS. 2a-d are flowcharts illustrating embodiments of a method in a communication node.
Figure 2B:
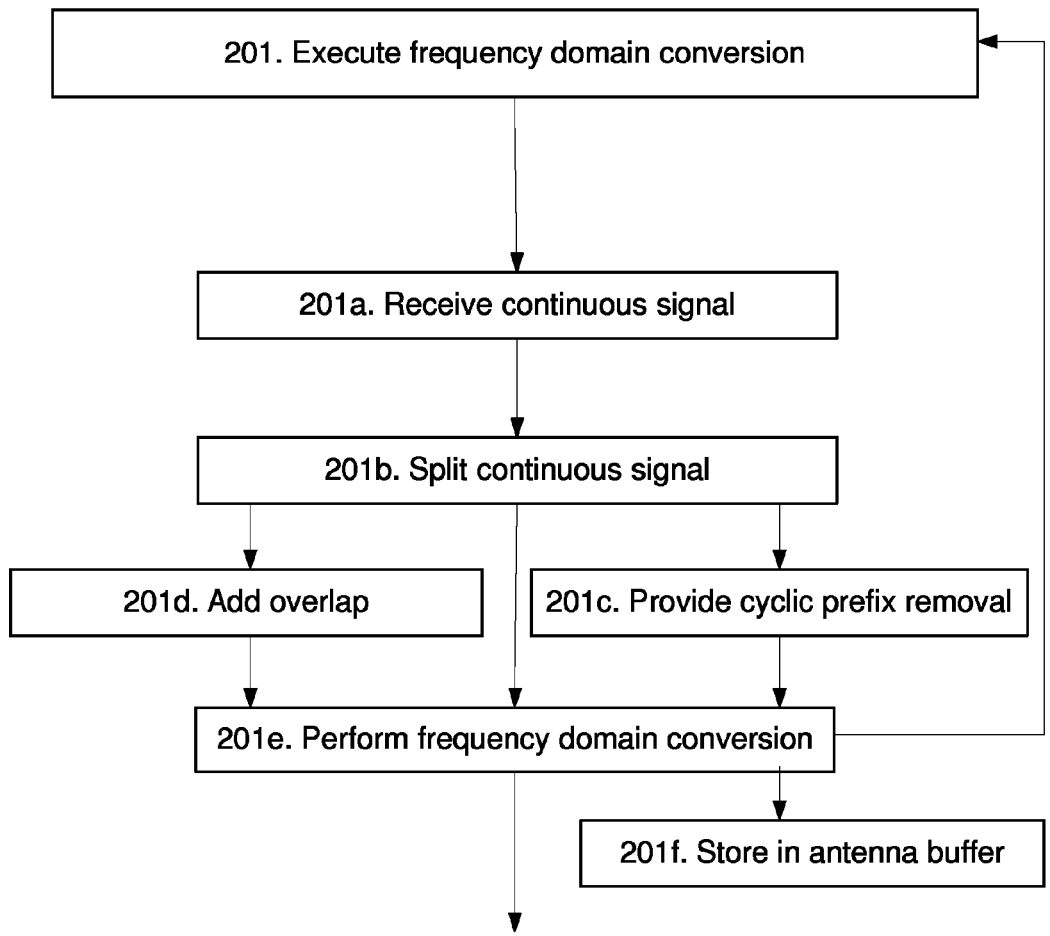
Figure 2C:
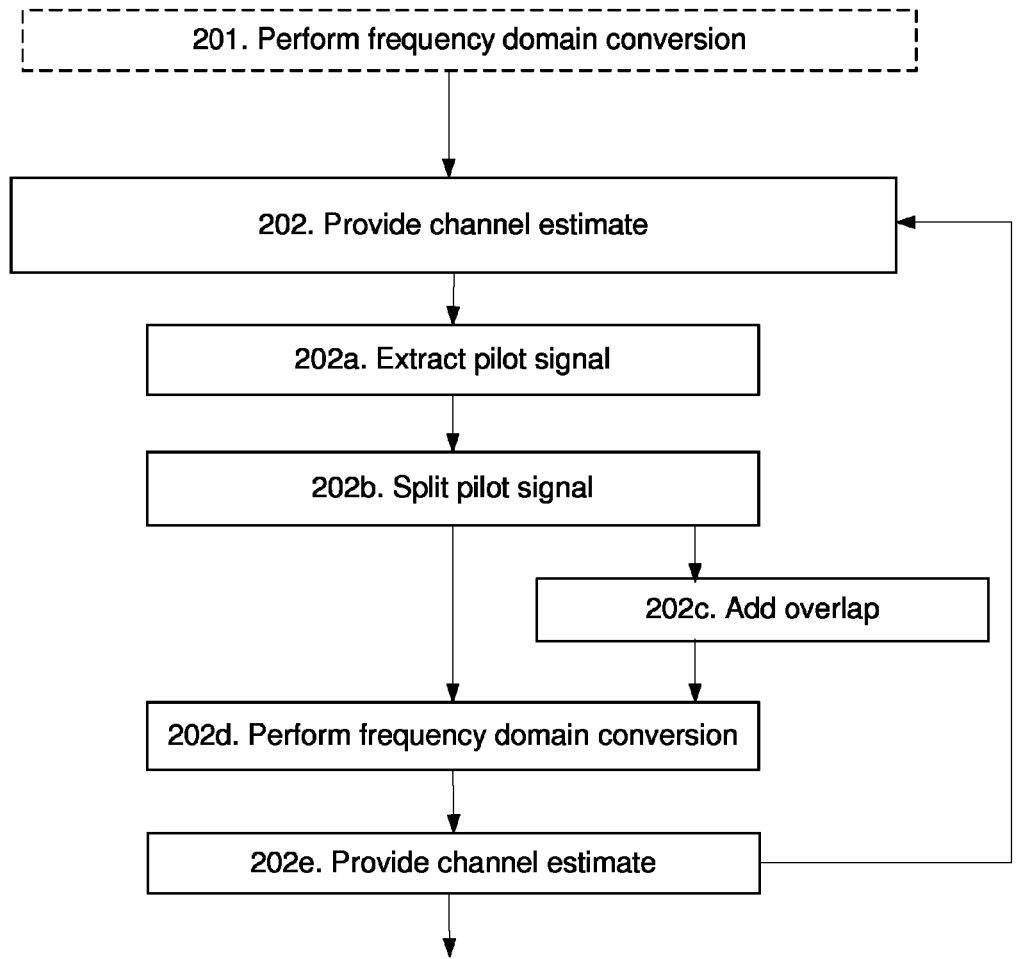
Figure 2D:
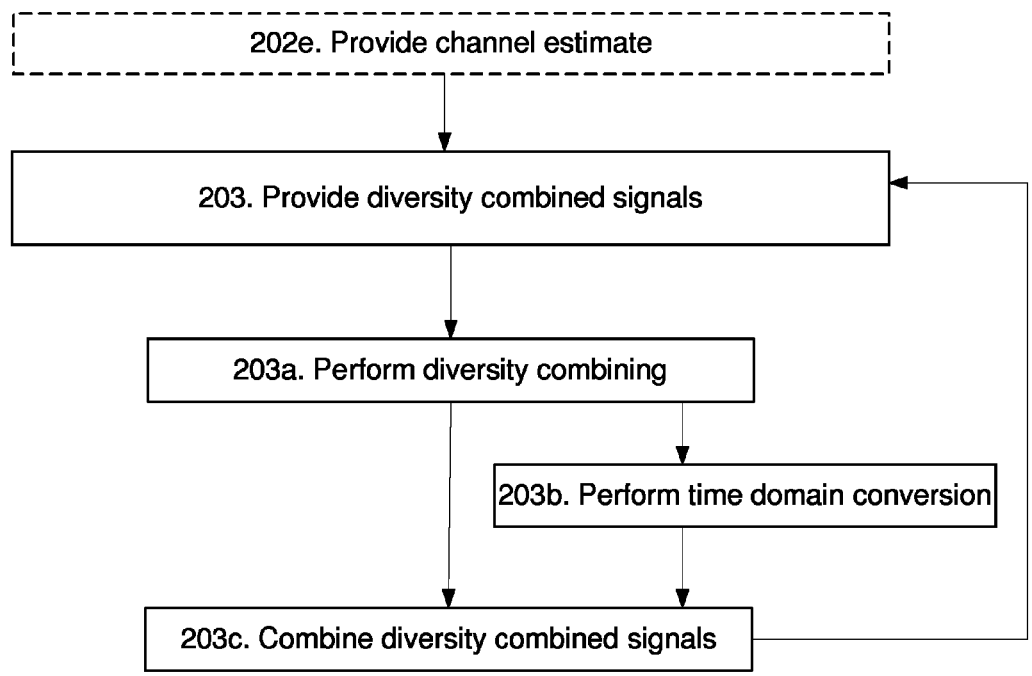

The present solution comprises a method, in a communication node 115, for improving signal handling according to some embodiments which will now be described with reference to flowcharts depicted in FIGS. 2a-d. FIG. 2a illustrates the main steps of the method, while FIGS. 2b-d illustrates sub-steps of the main steps. The communication node 115, e.g. a base station, eNodeB, comprises at least one antenna 120 and the communication node 115 is arranged to receive signals from the at least one antenna 120. The method comprises the following steps, which steps may as well be carried out in another suitable order than described below:

Step 201

The communication node 115 executes 201 frequency domain conversions for each received antenna signal. Frequency conversions comprise all operations needed from "one continuous time-domain sample series per antenna" to "a continuous series of frequency domain sample windows per antenna". The frequency domain conversion is an iterative process done for each antenna signal, and comprises the following sub steps:

Step 201a

The communication node 115 receives 201a a continuous signal from one of the at least one antenna 120.

Step 201b

The communication node 115 splits the continuous antenna signal into windowed signals. The windowed signals may have a fix length.

Step 201c

As an optional step, for LTE, a cyclic prefix removal may be provided to the windowed signal.

Step 201d

Figure 3:
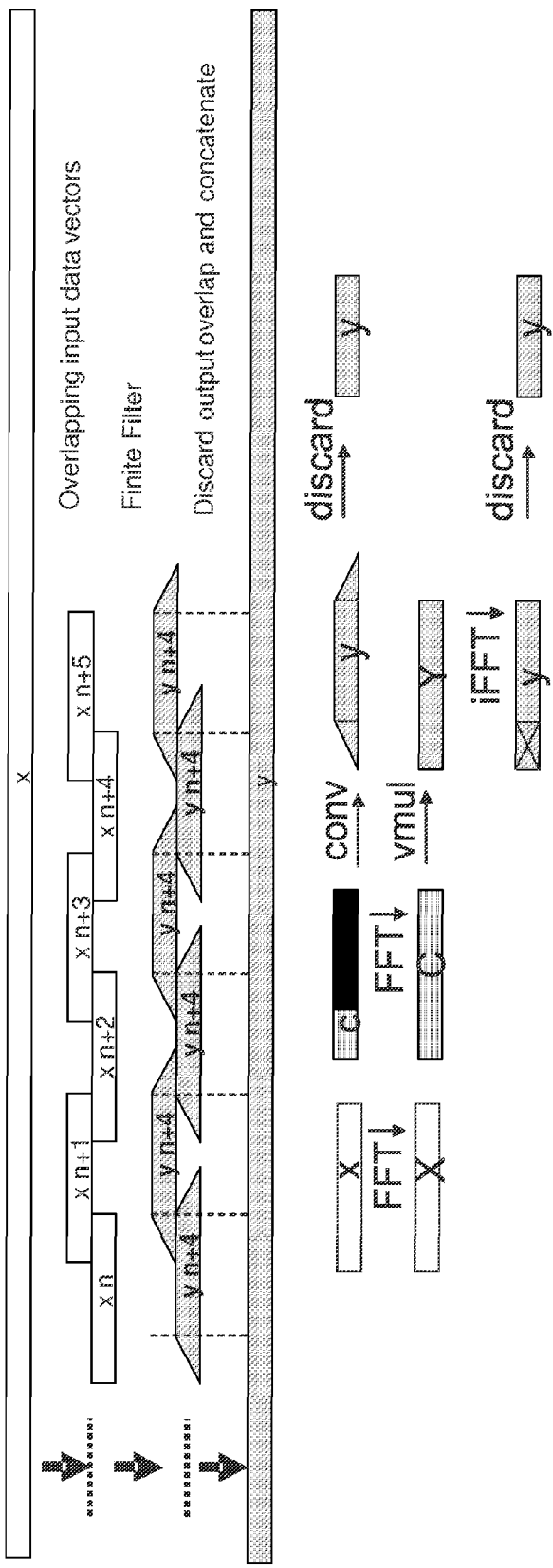
FIG. 3 is a block diagram illustrating an overlap/save algorithm.

As a further optional step, for WCDMA, overlap may be added to the windowed signal. This step may be performed by doing overlap/add (adding zeros) or overlap/save, which are methods well known for the skilled person. FIG. 3 describes how the continuous sample streams processed in a time domain WCDMA receiver may be split into discrete finite length sample sets by using the overlap add/save algorithm. This is crucial since all frequency domain algorithms using a digital FFT algorithm operates on finite sample sets.

Step 201e

A frequency domain conversion is performed on the windowed signals. The algorithm performing this conversion may be an FFT algorithm.

Step 201f

This is an optional step. The frequency converted windowed signal may be stored in an antenna signal buffer. The antenna signal buffer may be any suitable type of computer readable storage medium.

Step 202

After the execution of the frequency domain conversion in step 201, a channel estimate based on a frequency converted pilot signal is provided for every user equipment. This frequency domain conversion is done by using an FFT algorithm. This step is done by performing the following sub steps:

Step 202a

A pilot signal is extracted. A pilot signal is a known signal used for reference purposes.

Step 202b

The pilot signal is split into windowed signals.

Step 202c

This is an optional step. Overlap may be added to the windowed signal. This overlap procedure is equivalent to the one described for step 201d above. The overlap algorithm may be performed in the case of WCDMA.

Step 202d

A frequency domain conversion is performed of the split windowed pilot signal. The conversion may be performed by using an FFT algorithm.

Step 202e

A channel estimate is provided of the frequency converted pilot signal. This may also be called an MRC operation done in the frequency domain. More accurately, this is a correlation between the input signal and the pilot signal (both in the frequency domain). It may also include other operations, such as normalization of the resulting frequency domain correlation values, and different schemes to reduce measurement noise.

Ideally the received signal may be divided with the expected (known pilot) signal. This unfortunately amplifies noise for those received samples where the expected signal is zero or close to zero (since these values are in the denominator of the division). To solve this noise problem, the algorithm may include for example an iterative formula where the estimated channel values are updated based on the amplitude of the expected signal. Thus, introducing less noise when the expected signal amplitude is small.

Step 203

The next main step is to provide diversity combined signals. The signals are diversity combined by using the MRC method which basically means scaling input data with the conjugated channel estimates, and summing the antenna paths. Another method could be the Zero Forcing (ZF) method which is similar but instead input data is divided by the channel estimates.

Step 203a

Diversity combining based on the frequency converted windowed signals and the channel estimate is performed.

Step 203b

This is an optional step. A time domain conversion of the diversity combined signal may be performed. This step is done in the case of WCDMA and LTE. The time domain conversion may be done by using inverse FFT (iFFT).

For LTE uplink a special version of OFDMA is used, called Single Carrier-Frequency Division Multiple Access (SC-FDMA), where the iFFT (or inverse Discrete Fourier Transform (iDFT)) is used to do the time domain conversion. In WiMAX the sub-carriers are modulated with user data directly. In uplink LTE the user equipment data is firstly frequency converted, then placed on the chosen sub-carriers in the OFDMA symbol, and finally the transmitted time domain signal for the OFDMA signal is created using an iFFT.

Step 203c

The diversity combined signals are combined into a continuous signal. This relates to the fact that communication with user equipment 105 in the system normally lasts longer than a single FFT window. So in order to recreate the transmitted signal more than one FFT window must be combined. In particular for WCDMA where the transmitted signal is not divided into OFDM symbols with the cyclic prefix guard in-between to protect against Inter Symbol Interference (ISI), these FFT intervals must be overlapped, and thus joined appropriately (e.g. according to the overlap add or save methods).

Figure 4:
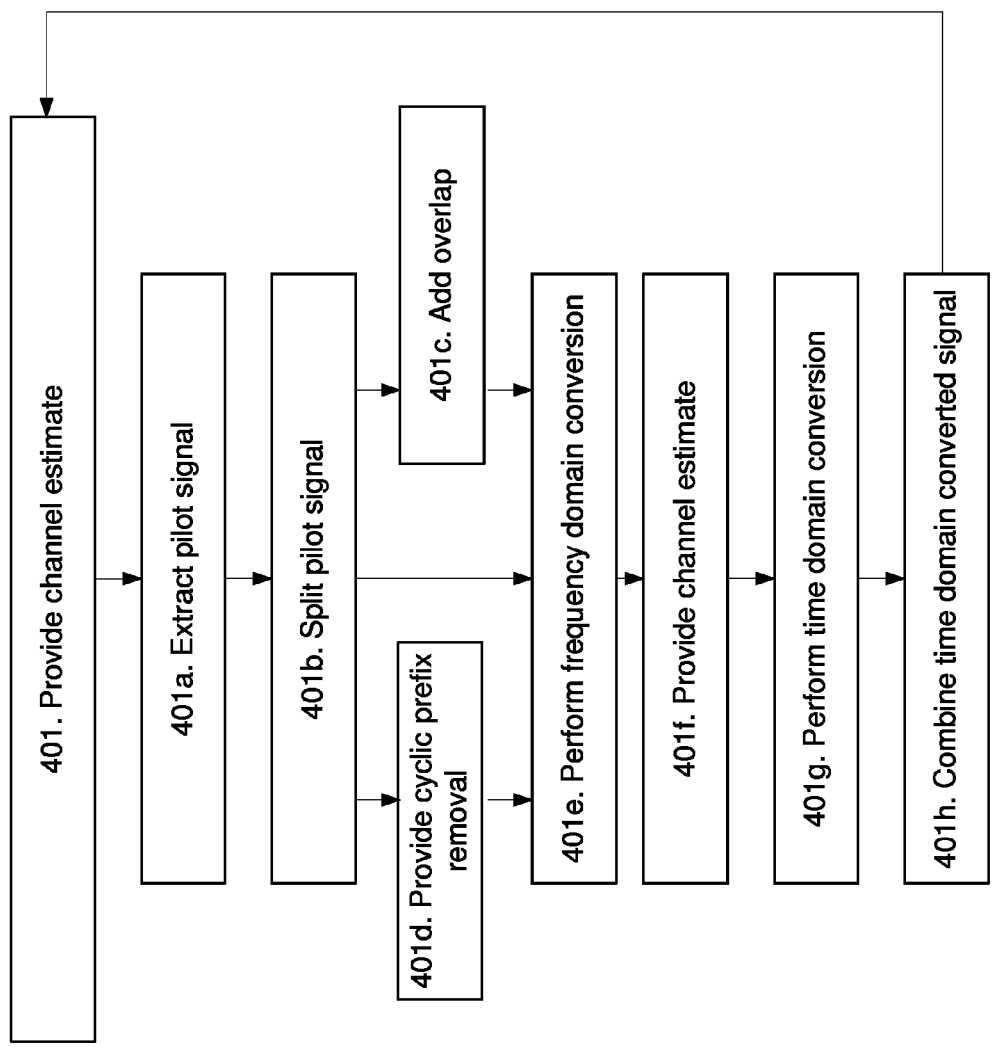
FIG. 4 is a flowchart illustrating embodiments of a method for a search operation in a communication node.

FIG. 4 is a flowchart illustrating embodiments of a search operation in a communication node 115. The search operation is valid for e.g. WCDMA, LTE and WiMAX. Searching is mostly about finding the time alignment of a user equipment 105 in the system 100, i.e. the round-trip-time (RTT). In the frequency domain all time information is hidden, and not revealed until transformed back to time domain. The method comprises the following steps:

Step 401

The main step of the search operation is to provide RTT and a channel estimate based on a frequency converted pilot signal. The purpose of the search operation is to find the user equipment 105 that sent the signal to the antenna 120 in the communication node 115. The antenna signal is compared with a known pilot signal. This main step comprises the following sub steps:

Step 401a

A pilot signal is extracted.

Step 401b

The pilot signal is split into windowed signals. It may be so that the pilot signal is not continuous, thus leaving some pilot windows zero, completely or in parts.

Step 401c

This is an optional step. Overlap may be added to the split windowed pilot signals. The overlap is done by using the procedure as described in relation to FIG. 3 above. The overlap may be done for WCDMA.

Step 401d

This is an optional step. For LTE, a cyclic prefix removal may be provided to the windowed pilot signals.

Step 401e

A frequency domain conversion is performed of the pilot signal. The frequency domain conversion may be an FFT algorithm.

Step 401f

A channel estimate of the frequency converted pilot signal is provided.

Step 401g

A time domain conversion is performed of the channel estimate. The time domain conversion may be an inverse FFT algorithm.

Step 401h

The time domain converted signal is combined into a continuous signal. This is done because the search window is normally longer than the FFT window.

Figure 5:
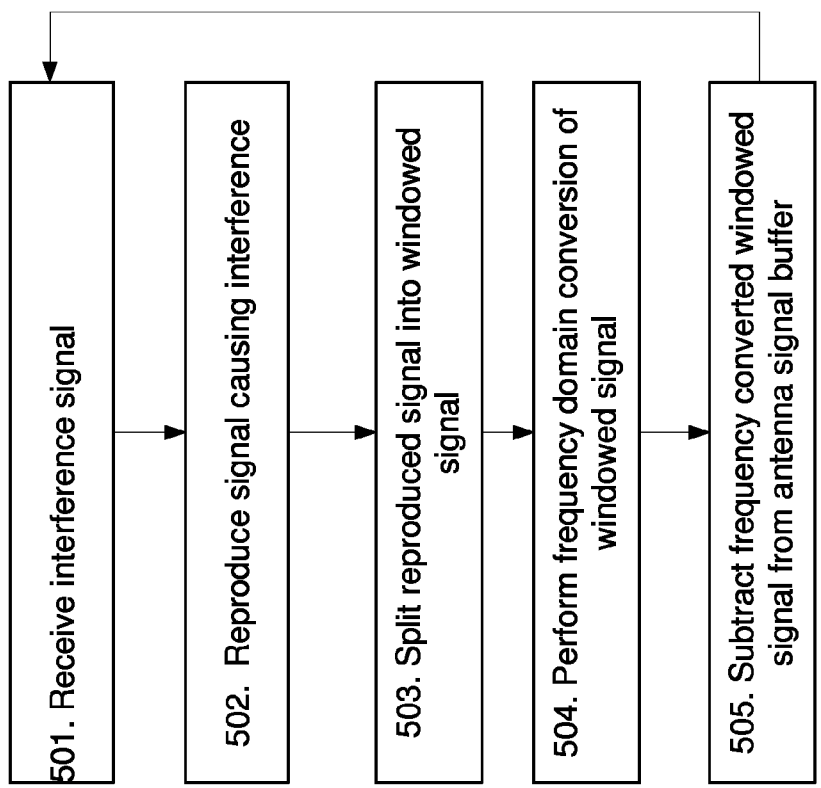
FIG. 5 is a flowchart illustrating embodiments of a method for interference cancelling in a communication node.

FIG. 5 is a flowchart illustrating embodiments of a method for interference canceling in a communication node 115. Interference cancellation is an example of a method to remove/reduce interference caused by, and degrades transmission performance of, these user equipments 105.

The standard use orthogonal spreading codes to facilitate separation of the individual user equipment signal, but this might not be enough. For WCDMA, the signals for different user equipments 105 are transmitted simultaneously on the same frequencies.

The remaining signal after the interference canceling has been performed contains a (much) smaller amount of the interfering signal. This may be repeated for more than one selected interfering signal.

The method for interference canceling comprises the steps of:

Step 501

An interference signal is received. This is a received interference signal that have caused interference degrading receiving performance of other signals on common frequency and time allocations.

Step 502

A signal (the transmitted signal) causing the interference is reproduced based on the interference signal. This is done by running the same operations used in the transmitter.

Step 503

The received signal is split into at least one windowed signal.

Step 504

A frequency domain conversion of the windowed signal is performed.

Step 505

The frequency domain signal is scaled with the channel estimates and calculates an estimate of the received interfering signal.

Step 506

The frequency converted windowed signal is subtracted from the antenna buffer.

Figure 6:
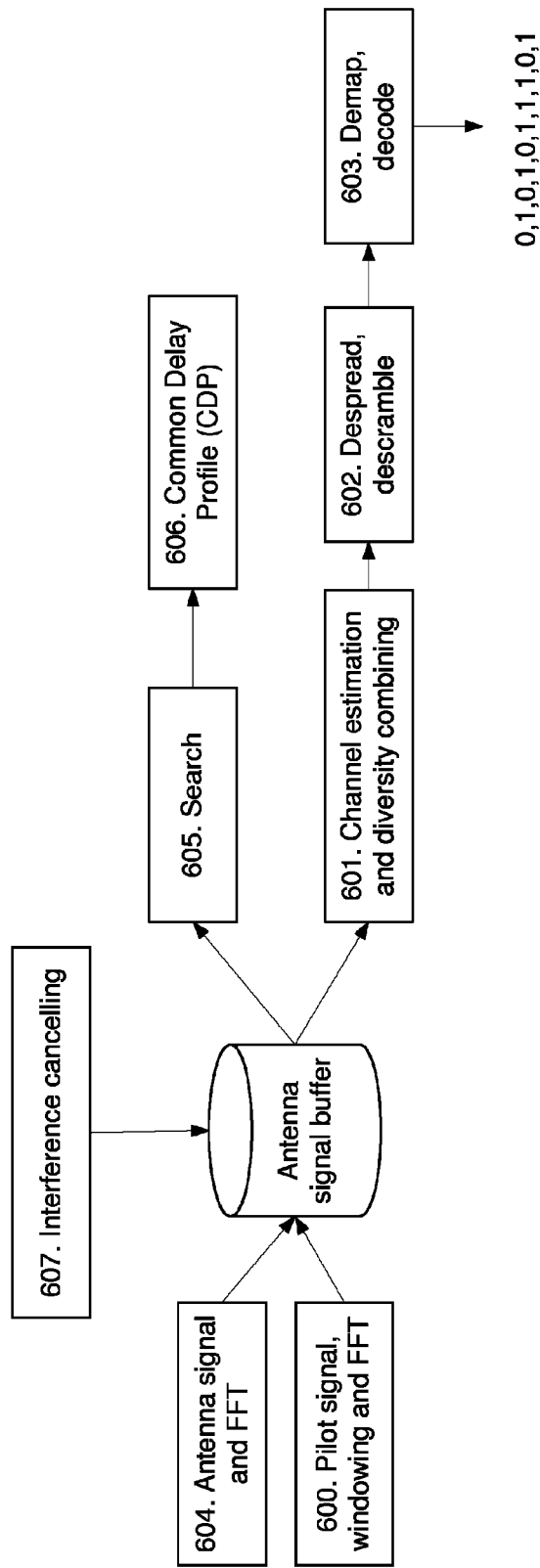
FIG. 6 is a block diagram illustrating embodiments of a method in a communication node.

FIG. 6 is a block diagram illustrating how the methods described for FIGS. 2, 4 and 5 are connected. The boxes 600, 601 and 604 are a generalization of the method described in FIG. 3. The outcome of channel estimation and diversity combining 601 is de-spread and descramble 602 and then de-mapped and decoded 603. The final outcome is seen as zeros and ones. The boxes 600 and 605 is a generalization of the method described in FIG. 4, search. The output of the search 605 is provided to a complex delay profile (CDP) 606. CDP It is the estimate of the RF channel impulse response. With this we can conclude on the RTT of the user equipment 105, and also get an initial channel estimate.

The box 607 is a generalization of the method described in FIG. 5, interference canceling. The output of the interference canceling 607, antenna signal and FFT 604 and pilot signal windowing and FFT 600 may be stored in an antenna signal buffer.

Figure 7:
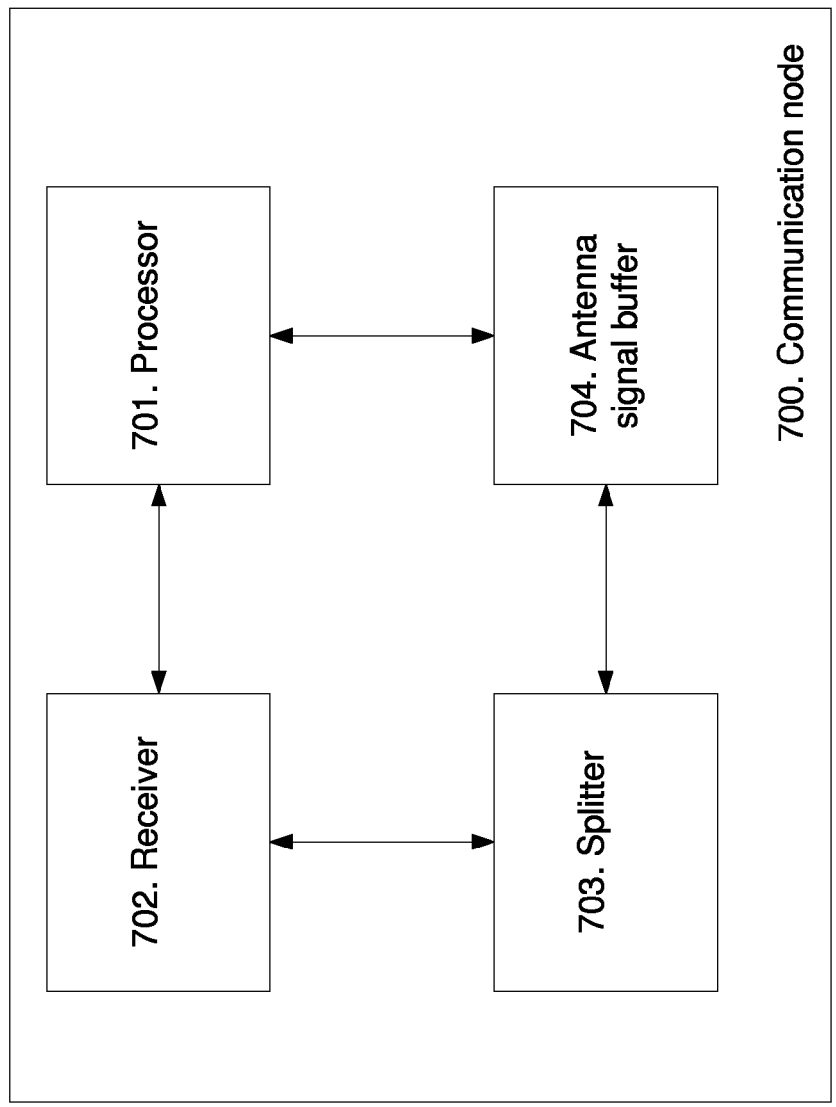
FIG. 7 is a schematic block diagram illustrating embodiments of a communication node.

To perform the method steps shown in FIGS. 2, 4, and 5 for improving signal handling in a wireless communication system 100, the communication node 115 may be as shown in FIG. 7. The communication node 700 is arranged to receive signals from the at least one antenna 120. The communication node 700 further comprises a processor 701 arranged to execute frequency domain conversion for each antenna signal, a receiver 702 arranged to receive a continuous signal from one of the at least one antenna 120, and a splitter 703 arranged to split the continuous antenna signal into windowed signals. The processor 701 is further arranged to perform a frequency domain conversion of the windowed signals, provide a channel estimate based on a frequency converted pilot signal, and to extract a pilot signal. The splitter 703 is further arranged to split the pilot signal into windowed signals. The processor 701 is even further arranged to perform a frequency domain conversion of the split pilot signal, provide a channel estimate of the frequency converted pilot signal, provide diversity combined signals, perform diversity combining based on the frequency converted windowed signals and the channel estimate, and to combine the diversity combined signals into a continuous signal. The communication node 115 may comprise an antenna signal buffer 704 arranged to store antenna signals.

The investment of introducing transformation into the frequency domain, and back into the time domain, is paid with the fact that the processing requirements does not grow, as much as the traditional time domain rake receiver, with the number of multipath components, i.e. rake fingers, used. So, at a certain number of multipath components the frequency domain approach is more efficient in terms of computational complexity.

Accelerating FFTs and a small set of vector operations will enable a cost efficient implementation that may support both WCDMA and LTE/WiMAX in the same device and using at least partly the same units of the device.

Furthermore, another benefit is that the number of rake fingers is not a limiting factor using the proposed frequency domain WCDMA receiver.

It is also known that different parts of known receiver algorithms are better suited to be executed in the frequency domain or time domain. E.g. the convolution which is trivial in the frequency domain, but has a very high computational complexity when done in time domain. So, by having a frequency domain WCDMA receiver, is possible to execute useful algorithms in the domain where they have their most efficient implementation.

It should be emphasized that the term "comprises/comprising" when used in this specification is taken to specify the presence of stated features, integers, steps or components, but does not preclude the presence or addition of one or more other features, integers, steps, components or groups thereof.

It should also be emphasized that the steps of the methods defined in the appended claims may, without departing from the present invention, be performed in another order than the order in which they appear in the claims.

The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A method in a communication node in a wireless communication system for improving signal handling, the communication node arranged to receive signals from at least one antenna and configured as a WCDMA receiver, the method comprising:
   executing a frequency domain conversion for two or more antenna signals from the at least one antenna, comprising:
      receiving a continuous WCDMA signal from one of the at least one antenna;
      splitting the continuous WCDMA signal into windowed signals; and
      performing a frequency domain conversion of the windowed signals;
   providing a channel estimate based on a frequency converted pilot signal comprising:
      extracting a pilot signal from the continuous WCDMA signal;
      splitting the pilot signal into windowed pilot signals;
      performing a frequency domain conversion of the windowed pilot signals; and
      providing a channel estimate of the frequency converted windowed pilot signals; and
   providing diversity combined signals, comprising:
      performing diversity combining based on the frequency converted windowed signals of the continuous WCDMA signal and the channel estimate; and
      combining the diversity combined signals to provide a continuous signal.

2. The method according to claim 1,
   wherein executing the frequency domain conversion for the two or more antenna signals, further comprises storing the frequency converted windowed signals in an antenna signal buffer.

3. The method according to claim 1, wherein executing the frequency domain conversion for the two or more antenna signals further comprises:
   adding an overlap to the windowed signals;
   wherein providing a channel estimate based on a frequency converted pilot signal further comprises:
      adding an overlap to the windowed pilot signals; and
   wherein providing diversity combined signals further comprises:
      performing a time domain conversion of the diversity combined signals.

4. The method according to claim 3,
   wherein adding an overlap to the windowed signals and the windowed pilot signals comprises an overlap/save step or an overlap/add step.

5. The method according to claim 1,
   wherein providing diversity combined signals further comprises performing a time domain conversion of the diversity combined signals.

6. The method according to claim 1,
   wherein combining the diversity combined signals to provide a continuous signal comprises adding overlap to the windowed pilot signals or discarding the windowed pilot signals.

7. The method according to claim 1, further comprising providing a further channel estimate based on a frequency converted pilot signal, comprising:
   extracting a pilot signal from the continuous WCDMA signal;
   splitting the pilot signal into windowed pilot signals;
   performing a frequency domain conversion of the windowed pilot signals;
   providing a channel estimate of the frequency converted windowed pilot signals;
   performing a time domain conversion of the channel estimate; and
   combining the time domain converted channel estimate into a continuous signal.

8. The method according to claim 7,
   wherein providing the further channel estimate of the frequency converted windowed pilot signal, further comprises: adding an overlap to the windowed pilot signal.

9. The method according to claim 2, wherein the method further comprises
   interference canceling, comprising:
      receiving an interference signal;
      reproducing, based on the interference signal, a signal causing the interference;
      splitting the reproduced signal into at least one windowed interfering signal;
      performing frequency domain conversion of the windowed interfering signal;
      scaling the frequency converted windowed interfering signal with the channel estimates; and
      subtracting the scaled frequency converted windowed interfering signal from the antenna buffer.

10. The method according to claim 1, wherein the communication node is a base station.

11. A communication node in a wireless communication system for improving signal handling, the communication node arranged to receive signals from at least one antenna and being configurable as a WCDMA receiver, the communication node comprising:
 a receiver arranged to receive two or more continuous WCDMA signals from one of the at least one antenna;
 a splitter arranged to split the two or more continuous WCDMA signals into windowed signals; and
 a processor arranged to execute a frequency domain conversion of the two or more windowed signals and to cause the communication node to:
  extract a pilot signal from the two or more continuous WCDMA signals;
  split the pilot signal into windowed pilot signals;
  perform a frequency domain conversion of the windowed pilot signals;
  provide a channel estimate of the frequency converted windowed pilot signals;
  provide diversity combined signals based on the frequency converted windowed signals of the continuous WCDMA signals and the channel estimate; and
  combine the diversity combined signals to provide a continuous signal.

12. The communication node according to claim 11, wherein the processor is configured:
 to execute the frequency domain conversion of the two or more continuous WCDMA signals by adding an overlap to the windowed signals,
 to provide the channel estimate of the frequency converted windowed pilot signal further by adding an overlap to the windowed pilot signals, and
 to cause the communication node to perform a time domain conversion of the diversity combined signals.

13. The communication node according to claim 12, wherein adding an overlap to the windowed signals and the windowed pilot signals comprises an overlap/save step or an overlap/add step.

14. The communication node according to claim 11, wherein the processor is further arranged to cause the communication node to provide a further channel estimate based on a frequency converted pilot signal, by:
 extracting a pilot signal from the two or more continuous WCDMA signals;
 splitting the pilot signal into windowed pilot signals;
 performing a frequency domain conversion of the windowed pilot signal;
 providing a channel estimate of the frequency converted windowed pilot signal;
 performing a time domain conversion of the channel estimate; and
 combining the time domain converted channel estimate into a continuous signal.

15. A method in a communication node in a wireless communication system for improving signal handling, the communication node arranged to receive signals from at least one antenna and configured as a WCDMA receiver, the method comprising:
 executing a frequency domain conversion for two or more antenna signals from the at least one antenna, comprising:
  receiving a continuous signal from one of the at least one antenna;
  splitting the continuous antenna signal into windowed signals;
  adding an overlap to the windowed signals; and
  performing a frequency domain conversion of the windowed signals;
 providing a channel estimate based on a frequency converted pilot signal comprising:
  extracting a pilot signal;
  splitting the pilot signal into windowed pilot signals;
  adding an overlap to the windowed pilot signals;
  performing a frequency domain conversion of the windowed pilot signals; and
  providing a channel estimate of the frequency converted windowed pilot signals;
 providing diversity combined signals, comprising:
  performing diversity combining based on the frequency converted windowed signals of the two or more antenna signals and the channel estimate; and
  performing a time domain conversion of the diversity combined signals
  combining the diversity combined signals to provide a continuous signal.

16. The method according to claim 15, wherein adding an overlap to the windowed signals and the windowed pilot signals comprises an overlap/save step or an overlap/add step.

17. The method according to claim 15, further comprising:
 providing a further channel estimate based on a frequency converted pilot signal, comprising:
  extracting a pilot signal;
  splitting the pilot signal into windowed pilot signals;
  performing a frequency domain conversion of the windowed pilot signal;
  providing a channel estimate of the frequency converted windowed pilot signal;
  performing a time domain conversion of the channel estimate; and
  combining the time domain converted channel estimate into a continuous signal.

* * * * *